(12) United States Patent
Chen et al.

(10) Patent No.: US 12,209,999 B2
(45) Date of Patent: Jan. 28, 2025

(54) METHOD FOR DETERMINING EQUILIBRIUM STATE OF TENSEGRITY STRUCTURE

(71) Applicants: SHANGHAI JIAO TONG UNIVERSITY, Shanghai (CN); NEW UNITED GROUP CO., LTD., Changzhou (CN)

(72) Inventors: Wujun Chen, Shanghai (CN); Jianhui Hu, Shanghai (CN); Bing Zhao, Shanghai (CN); Jun Yang, Changzhou (CN); Jiandong Xu, Changzhou (CN)

(73) Assignees: Shanghai Jiao Tong University (CN); New United Group Co., Ltd. (CN)

( * ) Notice: Subject to any disclaimer, the term of this patent is extended or adjusted under 35 U.S.C. 154(b) by 302 days.

(21) Appl. No.: 17/684,637

(22) Filed: Mar. 2, 2022

(65) Prior Publication Data

US 2022/0187177 A1 Jun. 16, 2022

Related U.S. Application Data

(63) Continuation-in-part of application No. PCT/CN2020/072245, filed on Jan. 15, 2020.

(30) Foreign Application Priority Data

Sep. 3, 2019 (CN) .......................... 201910828536.5

(51) Int. Cl.
  *G01N 3/08* (2006.01)
  *G01L 5/16* (2020.01)
  *G01N 3/20* (2006.01)
(52) U.S. Cl.
  CPC .................. *G01N 3/08* (2013.01); *G01L 5/16* (2013.01); *G01N 3/20* (2013.01)

(58) Field of Classification Search
  None
  See application file for complete search history.

(56) References Cited

U.S. PATENT DOCUMENTS

2015/0081256 A1* 3/2015 Ge .......................... G06F 30/20
  703/1
2016/0012156 A1 1/2016 Bickel et al.
  (Continued)

FOREIGN PATENT DOCUMENTS

CN  105350644 A    2/2016
CN  105803941 A *  7/2016
  (Continued)

OTHER PUBLICATIONS

Zhang Zhi-hong, et al., "Design and construction analysis of cable-strut tensile structures" (Spatial Structures, Jun. 2003, vol. 9, No. 2, 20-24).
  (Continued)

*Primary Examiner* — Raymond L Nimox
(74) *Attorney, Agent, or Firm* — Conley Rose, P.C.

(57) ABSTRACT

A method for determining the equilibrium state of a tensegrity structure includes: determining the critical bending moment that the tensegrity structure bears; calculating the tension of longitudinal tie rods; calculating the pressure of longitudinal compression members; calculating the tensile lengths and the unstressed lengths of the longitudinal tie rods; calculating the compressed lengths and the unstressed lengths of the longitudinal compression members; calculating the forces and the radial deformations of annular compression members; and calculating the positioning lengths and the manufacturing lengths of the longitudinal tie rods and the longitudinal compression members.

20 Claims, 4 Drawing Sheets

(56) References Cited

U.S. PATENT DOCUMENTS

2017/0021907 A1    1/2017  Rapport
2021/0199560 A1*   7/2021  Ma ........................... E01D 1/00

FOREIGN PATENT DOCUMENTS

| CN | 107142835 A   | 9/2017 |
| CN | 109853726 A   | 6/2019 |
| CN | 109969373 A   | 7/2019 |
| CN | 110015396 A   | 7/2019 |
| WO | 2019079096 A1 | 4/2019 |

OTHER PUBLICATIONS

International Search Report dated May 25, 2020, for Application No. PCT/CN2020/072245.

* cited by examiner

METHOD FOR DETERMINING EQUILIBRIUM STATE OF TENSEGRITY STRUCTURE

CROSS-REFERENCE TO RELATED APPLICATIONS

The present application is a continuation-in-part of International Patent Application No. PCT/CN2020/072245 filed Jan. 15, 2020, and entitled "Method for Determining Equilibrium Morphology of Tensegrity Structure," which claims priority to Chinese Patent Application No. CN 201910828536.5 filed Sep. 3, 2019, both of which are incorporated herein in their entirety for all purposes.

FIELD OF THE INVENTION

The present application relates to the field of engineering structure design and analysis, and in particular, to a method for determining the equilibrium state of a tensegrity structure.

DESCRIPTION OF THE PRIOR ART

The tensegrity structure is a tension self-balancing system composed of separated compression members and continuous tension members, with the least total number of members, the least compression members, and the lowest redundancy and freedom of mechanism, is ultra-light in weight, and gives full play to the strength of materials, thus being currently a research hotspot in many engineering technologies and leading edge cross-fields such as aerospace, architectural structures, sculpture art, intelligent robots, and molecular structure biology.

The state and rigidity of the tensegrity structure are maintained and generated by prestress, and the equilibrium state is the foundation. Therefore, the calculation and determination of prestress of the equilibrium state has always been the core problem in the research of tensegrity structures, and two problems need to be solved: firstly, how to calculate and determine a set of reasonable and feasible prestress; secondly, how to effectively generate this set of prestress.

The calculation of prestress is typically determined by applying equilibrium matrix decomposition based on the equilibrium state, solving a self-stress mode, recombining, and rigidity or weight objective optimizing. Pellegrino et al. established a relatively complete theoretical method for equilibrium matrix analysis. However, the self-stress is not necessarily reasonable. therefore, the concept of feasible pre-stress is proposed. Yuan Xingfei et al. put forward a concept of overall feasible prestress and a quadratic singular value method for solving this mode by taking advantage of the geometric symmetry of the structure. Chen Wujun et al. established a stress-free state determination method for cable-bar tension, and established a stress introduction analysis method and effectiveness analysis, as well as a vector projection method based on tensor norm. However, these methods are very complicated and require specialized software for analysis.

Chinese patent No. 201910275705.7 "LARGE-SCALE SEMI-RIGID STRUCTURE AIRSHIP" provides a semi-rigid structure airship with a tensegrity keel as the main structural system. Chinese Patent No. 201910275699.5 "COMPRESSION BAR CONTACT TYPE TENSEGRITY STRUCTURE AND INTERGRATION AND TENSION EXERTION METHOD" proposes a tensegrity keel composition and integration method. However, the calculation and determination method for the prestress of the equilibrium state is not clear.

Therefore, those skilled in the art are devoted to developing a method for determining the equilibrium state of a tensegrity structure, which can quickly, accurately and reasonably determine prestress values, member sizes for positioning, and tension introduction measures.

SUMMARY OF THE INVENTION

In view of the above-mentioned defects of the prior art, the technical problem to be solved by the present application is how to quickly, accurately and reasonably determine prestress values, member sizes for positioning, and tension introduction measures.

To achieve the above purpose, the present application provides a method for determining the equilibrium shape of a tensegrity structure, including the following steps:
determining the critical bending moment that the tensegrity structure bears; calculating the tension of longitudinal tie rods;
calculating the pressure of longitudinal compression members;
calculating the tensile lengths and the unstressed lengths of the longitudinal tie rods;
calculating the compressed lengths and the unstressed lengths of the longitudinal compression members;
calculating the forces and the radial deformations of annular compression members; and
calculating the positioning lengths and the manufacturing lengths of the longitudinal tie rods and the longitudinal compression members.

Further, the tensegrity structure is used as a keel system of an airship, and the critical bending moment is determined according to aerodynamic loads, static moments, and buoyancy gradient moments.

Further, the calculation of the critical bending moment is as follows:

$$M_{cr}=0.029[1+(L_a/D-4)(0.562L_a^{0.02}-0.5)]\rho_a u v_c V_e L_a^{0.25} \quad \text{Formula (1)}$$

where $L_a$ is the length of the airship, D is the maximum diameter of an external airbag of the airship, $\rho_a$ is the air density, u is the wind speed, $v_c$ is the speed of the airship, and $V_e$ is the volume of the external airbag.

Further, the calculation of the tension of the longitudinal tie rods comprises the following steps:
calculating the tension of first longitudinal tie rods, wherein the first longitudinal tie rods are longitudinal tie rods at cross-sections with the maximum resistance moment; and recursively calculating the tension of second longitudinal tie rods, wherein the second longitudinal tie rods are longitudinal tie rods on both sides of the first longitudinal tie rods.

Further, the calculation of the tension of the first longitudinal tie rods is as follows:

$$t_0 = M_{cr}/\Sigma_{i=1}^n d_i \quad \text{Formula (2)}$$

where $M_{cr}$ is the critical bending moment, and $d_i$ is the radial distance between the $i^{th}$ first longitudinal tie rod and the longitudinal compression member.

Further, according to a symmetrical method, the tension of the second longitudinal tie rods near a first end of the tensegrity structure and the tension of the second longitudinal tie rods near a second end of the tensegrity structure are calculated.

Further, the calculation of the tension of the second longitudinal tie rods is as follows:

$$t_j = t_{j-1}/\cos a_j \qquad \text{Formula (3)}$$

where $t_j$ is the tension of the second longitudinal tie rod in the $j^{th}$ section, $t_{j-1}$ is the tension of the second longitudinal tie rod in the $(j-1)^{th}$ section, and $a_j$ is a deflection angle between the longitudinal tie rod in the $j^{th}$ section and the longitudinal tie rod in the $(j-1)^{th}$ section.

Further, the calculation of the pressure of the longitudinal compression members is as follows:

$$N_{cj} = nt_1 \cos a_j \qquad \text{Formula (4)}$$

where $N_{cj}$ is the pressure of the longitudinal compression member in the $j^{th}$ section.

Further, the calculation of the unstressed lengths of the longitudinal tie rods is as follows:

$$l_j^u = \frac{E_j A_j}{E_j A_j + t_j} l_j^c \qquad \text{Formula (5)}$$

where $l_j^u$ is the unstressed length of the longitudinal tie rod in the $j^{th}$ section, $l_j^c$ is the current length of the longitudinal tie rod in the $j^{th}$ section under a prestress equilibrium state, $E_j A_j$ is the material elastic modulus and cross-sectional area of the longitudinal tie rod in the $j^{th}$ section, and $t_j$ is the tension of the longitudinal tie rod in the $j^{th}$ section.

Further, the calculation of the stretching amounts of the longitudinal tie rods is as follows:

$$\Delta l_j^t = l_j^c - l_j^u \qquad \text{Formula (6)}$$

where $\Delta l_j^t$ is the stretching amount of the longitudinal tie rod in the $j^{th}$ section.

Further, the calculation of the unstressed lengths of the longitudinal compression members is as follows:

$$l_{jc}^u = \frac{E_{jc} A_{jc}}{E_{jc} A_{jc} + N_{jc}} l_{jc}^c \qquad \text{Formula (7)}$$

where $l_{jc}^u$ is the unstressed length of the longitudinal compression member in the $j^{th}$ section, $l_{jc}^c$ is the current length of the longitudinal compression member in the $j^{th}$ section under a prestress equilibrium state, $E_{jc} A_{jc}$ is the material elastic modulus and cross-sectional area of the longitudinal compression member in the $j^{th}$ section, and $N_{jc}$ is the compressive axial force of the longitudinal compression member in the $j^{th}$ section.

Further, the calculation of the compression amounts of the longitudinal compression members is as follows:

$$\Delta l_j^n = l_{jc}^u - l_{jc}^c \qquad \text{Formula (8)}$$

where $\Delta l_j^n$ represents the compression amount of the longitudinal compression member in the $j^{th}$ section.

Further, the calculation of the forces of the annular compression members is as follows:

$$N_i = t_i \sin a_i - t_{i-1} \sin a_{i-1} \qquad \text{Formula (9)}$$

$$N_{ci} = N_i \times n/2\pi \qquad \text{Formula (14)}$$

where $N_i$ represents the force of the $i^{th}$ annular compression member, $N_{ci}$ represents the axial pressure of the $i^{th}$ annular compression member, $t_i$ represents the tension of the $i^{th}$ longitudinal tie rod, $a_i$ represents a deflection angle between the longitudinal tie rod in the $i^{th}$ section and the longitudinal tie rod in the $(i-1)^{th}$ section, and n represents the number of the longitudinal tie rods along the circumference of the annular compression member.

Further, the calculation of the deformations of the annular compression members is as follows:

$$\Delta R_i = R_i^u - R_i^c \qquad \text{Formula (15)}$$

where $R_i^c$ is the current radius of the $i^{th}$ annular compression member under an equilibrium state, and $R_i^u$ is the radius of the $i^{th}$ annular compression member under a stress-free state.

Further, according to a symmetrical method, the forces of the various annular compression members at a first end of the tensegrity structure and the forces of the various annular compression members at a second end of the tensegrity structure are calculated.

Further, in calculating the positioning lengths and the manufacturing lengths of the longitudinal compression members, minimum adjustment lengths of the longitudinal compression members satisfy the following formula:

$$\Delta L_{jc} \geq \Delta l_j^n + \Delta l_j^t \qquad \text{Formula (16)}$$

where $\Delta L_{jc}$ represents the minimum adjustment length of the longitudinal compression member in the $j^{th}$ section, $\Delta l_j^n$ represents the compression amount of the longitudinal compression member in the $j^{th}$ section, and $\Delta l_j^t$ is the stretching amount of the longitudinal tie rod in the $j^{th}$ section.

Further, the longitudinal tie rods are under tensile loads, with the material nonlinearity and damage being not considered; and the longitudinal compression members and the annular compression members are under compression loads, with the geometric nonlinearity and stability being considered.

Preferably, the longitudinal tie rods, the longitudinal compression members, and the annular compression members are composed of individual rod-shaped members.

Preferably, the longitudinal tie rods, the longitudinal compression members, and the annular compression members are truss structures.

Preferably, the longitudinal tie rods, the longitudinal compression members, and the annular compression members are made of carbon fiber composite materials.

With the method for determining the equilibrium state of a tensegrity structure proposed in the present application, it is possible to quickly and effectively determine the stress under a prestress equilibrium state, and the unstressed length of a tension-compression member, so as to provide a basis for production and installation; the prestress level is reasonable and feasible, which can meet the overall stress requirements of the structure; by determining the length and manufacturing length of the tension-compression member, it is easy to realize the integration of the tensegrity structure, effectively realize the introduction of prestress, and ensure the mechanical properties of the prestress equilibrium state; and the method is concise, efficient, small in calculation amount, and easy to implement.

The concept, specific structures, and technical effects of the present application will be further described below in conjunction with accompanying drawings, such that the purpose, features, and effects of the present application can be fully understood.

DETAILED DESCRIPTION OF THE PREFERRED EMBODIMENTS

Figure 1:
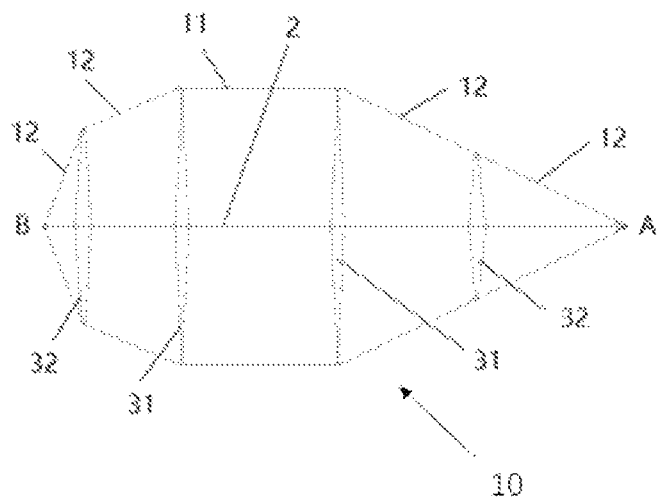
FIG. 1 is a schematic structural diagram of a tensegrity structure in a preferred embodiment of the present application.

A preferred embodiment of the present application will be introduced below with reference to the accompanying drawings of the specification, such that the technical content can be clearly and easily understood. The present application can be embodied through embodiments of many different forms, and the protection scope of the present application is not limited to the embodiments mentioned herein.

In the drawings, components with the same structure are represented by the same numerals, and components with similar structures or functions are represented by similar numerals. The size and thickness of each component shown in the drawings are arbitrarily shown, and the size and thickness of each component are not limited in the present application. In order to make the illustration clearer, the thicknesses of the components are appropriately exaggerated in some places in the drawings.

The tensegrity structure is a tension self-balancing system composed of separated compression members and continuous tension members. A typical tensegrity structure 10, as shown in FIG. 1, includes longitudinal tie rods, longitudinal central mandrels 2 and compression rings. The compression rings are ring compression members, the number of which is plural, including first compression rings 31 with the largest cross-sectional areas in the middle section and other second compression rings 32. In regions formed between a middle portion and two ends of the tensegrity structure 10, the numbers of the second compression rings 32 both can be set in a plurality, but not limited to one as shown in FIG. 1, and the areas of the second compression rings gradually decrease from the middle to the ends. There are a plurality of longitudinal tie rods, including first longitudinal tie rods 11 located at the largest cross-sections and a plurality of second longitudinal tie rods 12 located on tapered surfaces. A plurality of compression rings 31 and 32 are compressed separately, a plurality of longitudinal central mandrels 2 are longitudinal compression members, and a number of the first longitudinal tie rods 11 and the second longitudinal tie rods 12 are continuously tensioned to form a self-balancing and self-supporting tensegrity structure 10. The tensegrity structure 10 is a combined geometry, in which a plurality of first compression rings 31 and second compression rings 32 are arranged in parallel, the diameters of the first compression rings 31 located in the middle section are the same, and from the middle section to the two ends, the diameters of the plurality of second compression rings 32 gradually decrease. The first compression rings 31 located at the largest cross-sectional areas and the plurality of second longitudinal tie rods 32 are sequentially connected to the outer rings of the parallel first compression rings 31 and the second compression rings 32 to form closed tension rings.

The first longitudinal tie rods 11, the second longitudinal tie rods 12, the longitudinal central mandrels 2, the first compression rings 31 and the second compression rings 32 may be composed of individual rod-shaped members such as thin-walled tubes, or may be truss structures, and preferably made of high-performance carbon fiber composite material (CFRP). The purpose of the present application is to provide a method for determining the equilibrium state of a tensegrity structure. Whether the tensegrity structure is composed of individual rod-shaped members or truss structures, the method of the present application can be applied.

Figure 2:
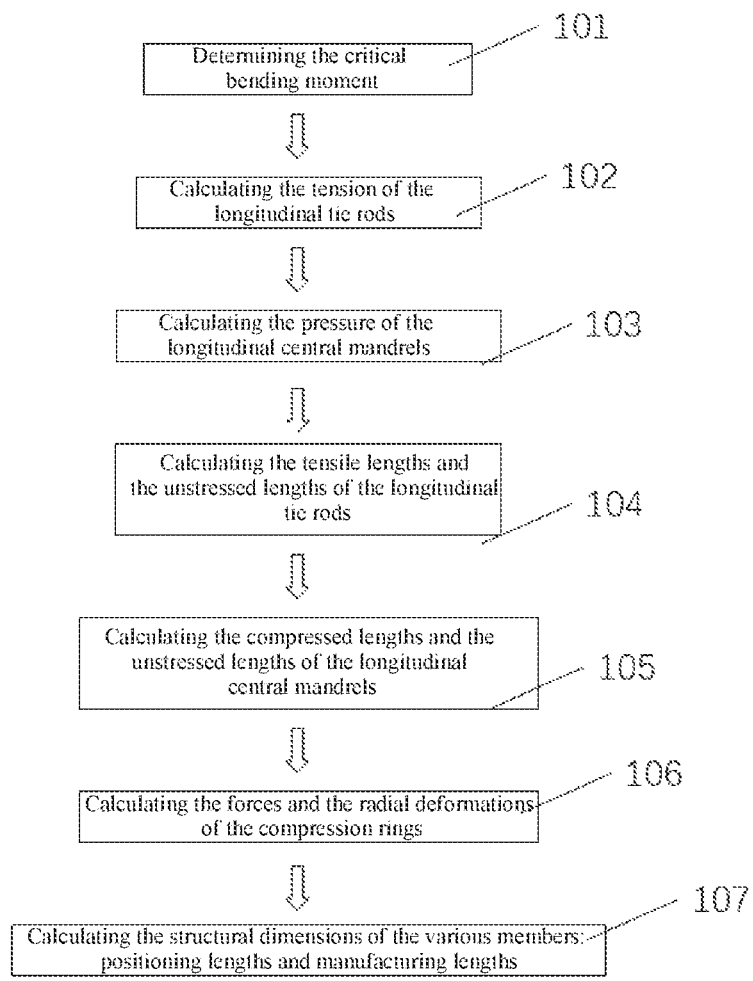
FIG. 2 is a flow chart of a method in a preferred embodiment of the present application.

As shown in FIG. 2, in a preferred embodiment of the present application, the method for determining the equilibrium state of the tensegrity structure 10 includes the following steps:

step 101: determining the critical bending moment that the tensegrity structure bears;

step 102: calculating the tension of the longitudinal tie rods;

step 103: calculating the pressure of the longitudinal central mandrels;

step 104: calculating the tensile lengths and the unstressed lengths of the longitudinal tie rods;

step 105: calculating the compressed lengths and the unstressed lengths of the longitudinal central mandrels;

step 106: calculating the forces and the radial deformations of the compression rings; and step 107: calculating the structural dimensions of the various members, including the positioning lengths and the manufacturing lengths.

Figure 6:
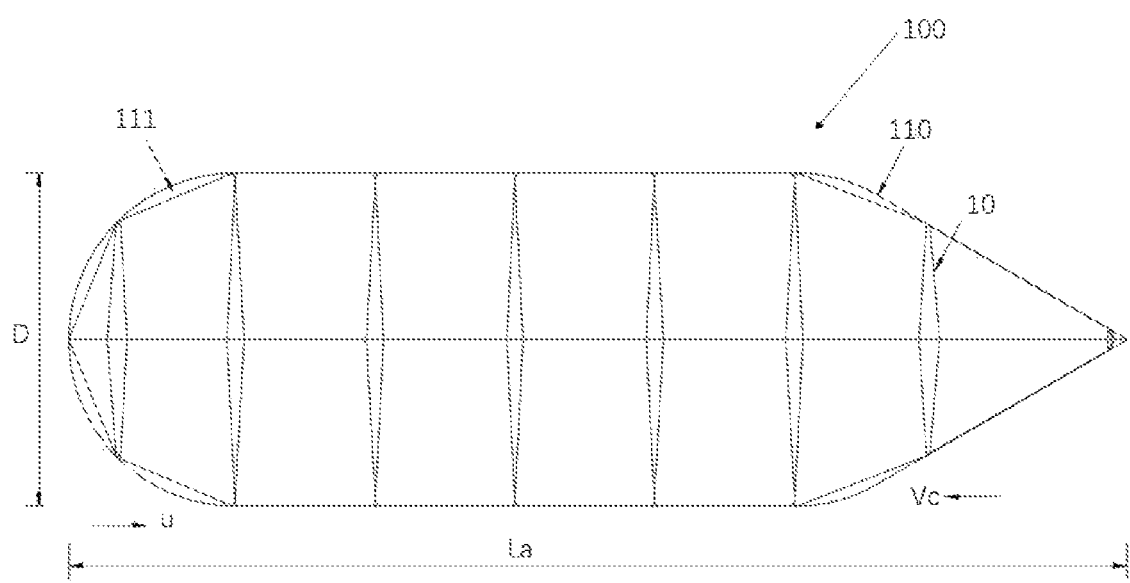
FIG. 6 is a schematic structural diagram of an airship in a preferred embodiment of the present application.

The method for determining the equilibrium state of the tensegrity structure 10 will be described in detail below in combination with the embodiments shown in FIG. 1 and FIG. 6.

Step 101: determining the critical bending moment $M_{cr}$ that the tensegrity structure 10 bears.

The critical bending moment $M_{cr}$ is determined according to the actual application scenarios and working conditions of the tensegrity structure 10. For example, as shown in FIG. 6, when the tensegrity structure 10 is used as a keel system of an airship 100, the tensegrity structure 10 is disposed in an external capsule 110 of the airship 100, and an external airbag 111 is wrapped around the tensegrity structure 10. In this case, the critical bending moment $M_{cr}$ can be calculated according to actual working parameters such as aerodynamic loads, static moments, and buoyancy gradient moments, and the calculation formula is as follows:

$$M_{cr}=0.029[1+(L_a/D-4)(0.562L_a^{0.02}-0.5)]\rho_a u v_c V_e L_a^{0.2} \quad \text{Formula (1)}$$

where $L_a$ is the length of the airship 100, D is the maximum diameter of the external airbag 111 of the airship, $\rho_a$ is the air density, u is the wind speed, $v_c$ is the speed of the airship, and $V_e$ is the volume of the external airbag 111.

Step 102: calculating the tension of the longitudinal tie rods.

Figure 3:
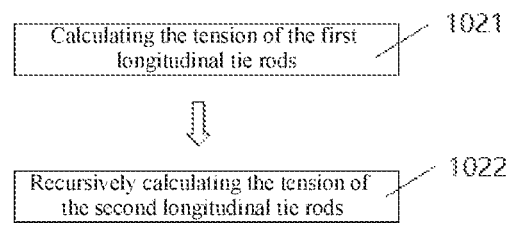
FIG. 3 is a flow chart of a method for calculating the tension of a longitudinal tie rod in a preferred embodiment of the present application.

As shown in FIG. 1, the first longitudinal tie rods 11 are located in the middle section of the tensegrity structure 10, that is, where the cross-sectional area is the largest, and the plurality of second longitudinal tie rods 12 form structures similar to tapered surfaces. When calculating the tension of the longitudinal tie rods, the calculation steps are as shown in FIG. 3, that is, step 1021: firstly, calculating the tension of the first longitudinal tie rods 11; and step 1022: then, recursively calculating the tension of the second longitudinal tie rods 12.

Step 1021: calculating the tension of the first longitudinal tie rods 11.

The tension of the first longitudinal tie rods 11 at cross-sections with the maximum resistance moment is calculated according to the critical bending moment $M_{cr}$ of pretension resistance and the critical condition of pretension failure, that is, the tension on the compression side of the tensegrity structure 10 is zero under the action of bending moment.

Figure 4:
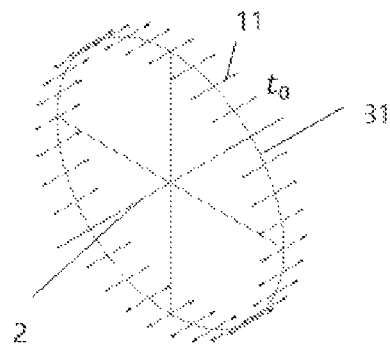
FIG. 4 is a schematic tension diagram of a first longitudinal tie rod in a preferred embodiment of the present application.

At each compression ring, the longitudinal tie rods are evenly arranged along the compression ring. Taking the first compression rings 31 and the first longitudinal tie rods 11 at the largest cross-sections as an example, as shown in FIG. 4, the number of the first longitudinal tie rods 11 is n, the radius of the compression rings is $R_{max}$, and the tension of the first longitudinal tie rods 11 is $t_0$, which may be expressed as:

$$t_0 = M_{cr}/\Sigma_{i=1}^n d_i \qquad \text{Formula (2)}$$

where $M_{cr}$ is the critical bending moment, and $d_i$ is the radial distance between the $i^{th}$ first longitudinal tie rod and the longitudinal central mandrel 2.

Step 1022: calculating the tension of the second longitudinal tie rods 12.

The tension of the second longitudinal tie rods 12 is calculated recursively according to a static equilibrium condition for separation of the tensegrity structure 10.

Figure 5:
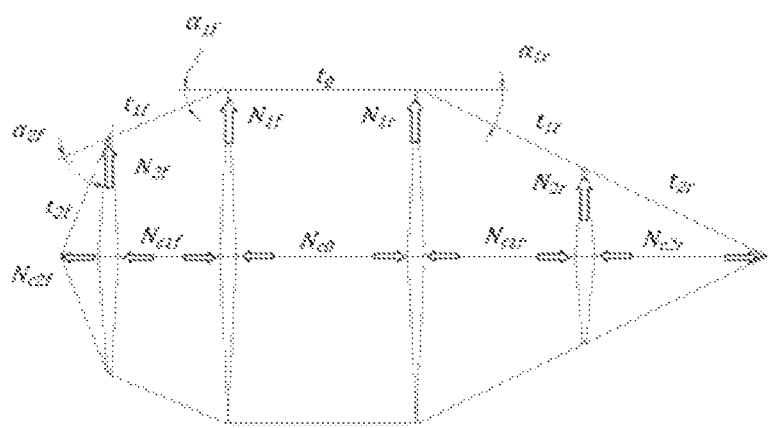
FIG. 5 is a schematic diagram of the prestress of the equilibrium state in a preferred embodiment of the present application.

As shown in FIG. 5, according to the equilibrium condition, the tension of the second longitudinal tie rods 12 can be expressed recursively as:

$$t_j = t_{j-1}/\cos a_j \qquad \text{Formula (3)}$$

where $t_j$ is the tension of the second longitudinal tie rod 12 in the $j^{th}$ section, $t_{j-1}$ is the tension of the second longitudinal tie rod 12 in the $(j-1)^{th}$ section, $a_j$ is a deflection angle between the $j^{th}$ longitudinal tie rod and the $(j-1)^{th}$ longitudinal tie rod. The longitudinal tie rods here include the first longitudinal tie rods 11 and the second longitudinal tie rods 12, counting from the first longitudinal tie rods 11. Unless otherwise distinguished, the first longitudinal tie rods 11 and the second longitudinal tie rods 12 are included below.

As shown in FIGS. 1 and 5, the cross-sectional diameter of the tensegrity structure 10 decreases from the middle section to the two ends respectively, and a plurality of second longitudinal tie rods 12 are respectively arranged between the middle section and one end. Here, the end A in FIG. 1 is defined as the head, and the end B as the tail. When recursively calculating the tension of the second longitudinal tie rods 12, it can be calculated through a symmetrical method, and subscripts are used to distinguish the tension of the second longitudinal tie rods 12 near the head from the tension of the second longitudinal tie rods 12 near the tail. Specifically, as shown in FIG. 5, the sub scripts f and r in $t_{jr}$, $t_{jf}$, $a_{jr}$, and $a_{jf}$ represent the front and rear respectively. Similarly, the sub scripts f and r in $N_{cjf}$, $N_{cjr}$, $N_{jf}$ and $N_{if}$ also represent the head and tail, which will not be repeated hereinbelow, where j=0, 1, 2, . . . .

Step 103: calculating the pressure of the longitudinal central mandrels 2.

The longitudinal central mandrels 2 are longitudinal compression members. The longitudinal central mandrels 2 are under pressure, and the pressure is balanced with the tension of the longitudinal tie rods. The pressure of the longitudinal central mandrels 2 is:

$$N_{cj} = n t_j \cos a_j \qquad \text{Formula (4)}$$

where $N_{cj}$ is the pressure of the longitudinal central mandrel 2 in the $j^{th}$ section.

Step 104: calculating the tensile lengths and the unstressed lengths of the first longitudinal tie rods 11 and the second longitudinal tie rods 12.

The tensile lengths of the first longitudinal tie rods 11 and the second longitudinal tie rods 12 are calculated according to the tension of the first longitudinal tie rods 11 and the second longitudinal tie rods 12, the stressed lengths of the first longitudinal tie rods 11 and the second longitudinal tie rods 12 under the current prestress equilibrium state, and the tensile rigidities of the first longitudinal tie rods 11 and the second longitudinal tie rods 12, and then the unstressed lengths of the first longitudinal tie rods 11 and the second longitudinal tie rods 12 are calculated.

The unstressed lengths of the first longitudinal tie rods 11 and the second longitudinal tie rods 12 are:

$$l_j^u = \frac{E_j A_j}{E_j A_j + t_j} l_j^c \qquad \text{Formula (5)}$$

where $l_j^u$ is the unstressed length of the longitudinal tie rod in the $j^{th}$ section, $l_j^c$ is the current length of the longitudinal tie rod in the $j^{th}$ section under the prestress equilibrium state, $E_j A_j$ is the material elastic modulus and cross-sectional area of the longitudinal tie rod in the $j^{th}$ section, and $t_j$ is the tension of the longitudinal tie rod in the $j^{th}$ section.

The stretching amounts of the first longitudinal tie rods 11 and the second longitudinal tie rods 12 are:

$$\Delta l_j^t = l_j^c - l_j^u \qquad \text{Formula (6)}$$

where $\Delta l_j^t$ is the stretching amount of the longitudinal tie rod of the $j^{th}$ section, where $l_j^u > l_j^c$.

Step 105: calculating the compressed lengths and the unstressed lengths of the longitudinal central mandrels 2.

The compressed lengths of the longitudinal central mandrels 2 are calculated according to the pressure of the longitudinal central mandrels 2, the stressed lengths of the longitudinal central mandrels 2 under the current prestress equilibrium state, and the compressive rigidities of the longitudinal central mandrels 2, and then the unstressed lengths of the longitudinal central mandrel 2 are calculated.

The unstressed lengths of the longitudinal central mandrels 2 are:

$$l_{jc}^u = \frac{E_{jc} A_{jc}}{E_{jc} A_{jc} + N_{jc}} l_{jc}^c \qquad \text{Formula (7)}$$

where $l_{jc}^u$ is the unstressed length of the longitudinal central mandrel 2 in the $j^{th}$ section, $l_{jc}^c$ is the current length of the longitudinal central mandrel 2 in the $j^{th}$ section under the prestress equilibrium state, $E_{jc} A_{jc}$ is the material elastic modulus and cross-sectional area of the longitudinal central mandrel 2 in the $j^{th}$ section, and $N_{jc}$ is the compressive axial force of the longitudinal central mandrel 2 in the $j^{th}$ section.

The compression amounts of the longitudinal central mandrels 2 are:

$$\Delta l_j^n = l_{jc}^u - l_{jc}^c \qquad \text{Formula (8)}$$

where $\Delta l_j^n$ represents the compression amount of the longitudinal central mandrel 2 in the $j^{th}$ section, where $l_{jc}^u > l_{jc}^c$.

Step 106: calculating the forces and the radial deformations of the compression rings 31 and 32.

The axial pressure and the radial deformations of the first compression rings 31 and the second compression rings 32 are calculated according to the tension of the first longitudinal tie rods 11 and the second longitudinal tie rods 12, and the radii and geometric relationships of the first compression rings 31 and the second compression rings 32 under the current prestress equilibrium state.

The forces $N_i$ of the compression rings are:

$$N_i = t_i \sin a_i - t_{i-1} \sin a_{i-1} \qquad \text{Formula (9)}$$

where $N_i$ represents the force of the $i^{th}$ compression ring.

As shown in FIG. 5, in this embodiment, there are two compression rings at the head and tail respectively, and the forces of the compression rings are calculated as follows:

$$N_{1f} = t_{1f} \cos a_{1f} \quad \text{Formula (10)}$$

$$N_{1r} = t_{1r} \cos a_{1r} \quad \text{Formula (11)}$$

$$N_{2f} = t_{2f} \sin a_{2f} - t_{1f} \sin a_{1f} \quad \text{Formula (12)}$$

$$N_{2r} = t_{2r} \sin a_{2r} - t_{1r} \sin a_{1r} \quad \text{Formula (13)}.$$

A compression ring has n longitudinal tie rods along its circumference, so the axial pressure of the compression ring is:

$$N_{ci} = N_i \times n / 2\pi \quad \text{Formula (14)}.$$

According to the symmetrical method, the axial pressure of each compression ring at the front head and rear tail can be calculated.

The deformations of the first compression rings 31 and the second compression rings 32 are changes in the radii of the compression rings:

$$\Delta R_i = R_i^u - R_i^c \quad \text{Formula (15)}$$

where $R_i^c$ is the radius of the $i^{th}$ compression ring under an equilibrium state, and $R_i^u$ is the radius of the $i^{th}$ compression ring under a stress-free state.

Step 107: calculating the structural dimensions of the various members, including the positioning lengths and the manufacturing lengths.

According to the stressed lengths of the first longitudinal tie rods 11 and the second longitudinal tie rods 12, and the stressed lengths of the longitudinal central mandrels 2 under the prestress equilibrium state, the unstressed lengths of the first longitudinal tie rods 11 and the second longitudinal tie rods 12, and the unstressed lengths of the longitudinal central mandrels 2, and considering the stress-free geometric consistency for a tension introduction method and installation and integration, the positioning lengths and the manufacturing lengths of the first longitudinal tie rods 11, the second longitudinal tie rods 12, and the longitudinal central mandrels 2 are calculated.

Minimum adjustment lengths of the longitudinal central mandrels 2 are:

$$\Delta L_{jc} \geq \Delta l_j^u + \Delta l_j^t \quad \text{Formula (16)}$$

where $\Delta L_{jc}$ is the minimum adjustment length of the longitudinal central mandrel 2 in the $j^{th}$ section.

The calculation of the compression amounts of the longitudinal central mandrels 2, the first compression rings 31 and the second compression rings 32 can be performed through numerical analysis by using a structural analysis software.

For the stability analysis of the longitudinal central mandrels 2, the first compression rings 31 and the second compression rings 32, numerical nonlinear stability analysis and calculation can be performed by using a structural analysis software.

The first longitudinal tie rods 11 and the second longitudinal tie rods 12 are linearly elastic at a tensile load stage, without considering material nonlinearity and damage problems; and the longitudinal central mandrels 2, the first compression rings 31 and the second compression rings 32 are linearly elastic at a compression stage, and geometric nonlinearity and stability should be considered when calculating the compression length.

Structural dimensions in this embodiment: the airship length $L_a$, the maximum radius $R_{max}$ or diameter D, the radii $R_i^c$ of the compression rings, the number n of the longitudinal tie rods, the number of sections, the lengths $l_{jc}^c$ of the longitudinal compression members, the lengths $l_j^c$ of the longitudinal tie rods, material and process selection (the longitudinal tie rods, the longitudinal central mandrels, and the compression rings are made of CFRP), as well as the critical bending moment (required by environmental loads and flight performances, and structural performances), prestress values (longitudinal tie rod tension $t_j$, longitudinal compression member pressure $N_{jc}$, and compression ring axial pressure $N_{ci}$) can be determined for specific engineering applications.

Preferred specific embodiments of the present application are described in detail above. It should be understood that those of ordinary skills in the art may make many modifications and changes according to the concept of the present application without creative work. Therefore, all technical solutions that can be obtained by those skilled in the art through logical analysis, reasoning or limited experiments based on the concept of the present application and the prior art should fall within the scope of protection defined by the claims.

The invention claimed is:

1. A method for manufacturing a tensegrity structure, comprising the following steps:
    determining an equilibrium state of the tensegrity structure, which comprises:
        determining a critical bending moment that the tensegrity structure bears;
        calculating a tension of longitudinal tie rods;
        calculating a pressure of longitudinal compression members;
        calculating tensile lengths and unstressed lengths of the longitudinal tie rods;
        calculating compressed lengths and unstressed lengths of the longitudinal compression members;
        calculating forces and radial deformations of annular compression members; and
        calculating positioning lengths and manufacturing lengths of the longitudinal tie rods and the longitudinal compression members;
    manufacturing the longitudinal tie rods and the longitudinal compression members according to the calculated positioning lengths and manufacturing lengths of the longitudinal tie rods and the longitudinal compression members; and
    forming the tensegrity structure with a plurality of the annular compression members, the manufactured longitudinal tie rods and the manufactured longitudinal compression members.

2. The method for manufacturing a tensegrity structure of claim 1, wherein the tensegrity structure is used as a keel system of an airship, and the critical bending moment is determined according to aerodynamic loads, static moments, and buoyancy gradient moments.

3. The method for manufacturing a tensegrity structure of claim 2, wherein the calculation of the critical bending moment is as follows:

$$M_{ar} = 0.029 \left[ 1 + (L_a/D - 4)(0.562_a^{0.02} - 0.5) \right] \rho_a u v_a V_R L_a^{0.25}$$

where $L_a$ is a length of the airship, D is a maximum diameter of an external airbag of the airship, $\rho_a$ is a air density, u is a wind speed, $v_c$ is a speed of the airship, and $V_e$ is a volume of the external airbag.

4. The method for manufacturing a tensegrity structure of claim 1, wherein the calculation of the tension of the longitudinal tie rods comprises the following steps:

calculating a tension of first longitudinal tie rods, wherein the first longitudinal tie rods are longitudinal tie rods at cross-sections with a maximum resistance moment; and recursively calculating a tension of second longitudinal tie rods, wherein the second longitudinal tie rods are longitudinal tie rods on both sides of the first longitudinal tie rods.

5. The method for manufacturing a tensegrity structure of claim 4, wherein the calculation of the tension of the first longitudinal tie rods is as follows:

$$t_3 = M_{cr} / \sum_{i=1}^{n} d_i$$

where $M_{cr}$ is the critical bending moment, and $d_i$ is a radial distance between the $i^{th}$ first longitudinal tie rod and the longitudinal compression member.

6. The method for manufacturing a tensegrity structure of claim 4, wherein according to a symmetrical method, the tension of the second longitudinal tie rods near a first end of the tensegrity structure and the tension of the second longitudinal tie rods near a second end of the tensegrity structure are calculated.

7. The method for manufacturing a tensegrity structure of claim 5, wherein the calculation of the tension of the second longitudinal tie rods is as follows:

$$t_i = t_{j-1} / \cos a_i$$

where $t_j$ is the tension of the second longitudinal tie rod in the $j^{th}$ section, $t_{j-1}$ is the tension of the second longitudinal tie rod in the $(j-1)^{th}$ section, and $a_i$ is a deflection angle between the longitudinal tie rod in the $j^{th}$ section and the longitudinal tie rod in the $(j-1)^{th}$ section.

8. The method for manufacturing a tensegrity structure of claim 7, wherein the calculation of the pressure of the longitudinal compression members is as follows:

$$N_{cj} = n t_1 \cos a_j$$

where $N_{cj}$ is the pressure of the longitudinal compression member in the $j^{th}$ section.

9. The method for manufacturing a tensegrity structure of claim 1, wherein the calculation of the unstressed lengths of the longitudinal tie rods is as follows:

$$l_j^u = \frac{E_j A_j}{E_j A_j + t_j} l_j^c$$

where $l_j^u$ is the unstressed length of the longitudinal tie rod in the $j^{th}$ section, $l_j^c$ is a current length of the longitudinal tie rod in the $j^{th}$ section under a prestress equilibrium state, $E_j A_j$ is material elastic modulus and cross-sectional area of the longitudinal tie rod in the $j^{th}$ section, and $t_j$ is the tension of the longitudinal tie rod in the $j^{th}$ section.

10. The method for manufacturing a tensegrity structure of claim 9, wherein the calculation of the stretching amounts of the longitudinal tie rods is as follows:

$$\Delta l_j^t = l_j^c - l_j^u$$

where $\Delta l_j^c$ is a stretching amount of the longitudinal tie rod in the $j^{th}$ section.

11. The method for manufacturing a tensegrity structure of claim 1, wherein the calculation of the unstressed lengths of the longitudinal compression members is as follows:

$$l_{jc}^u = \frac{E_{jc} A_{jc}}{E_{jc} A_{jc} + N_{jc}} l_{jc}^c$$

where $l_{jc}^u$ is the unstressed length of the longitudinal compression member in the $j^{th}$ section, $l_{jc}^c$ is a current length of the longitudinal compression member in the $j^{th}$ section under a prestress equilibrium state, $E_{jc} A_{jc}$ is material elastic modulus and cross-sectional area of the longitudinal compression member in the $j^{th}$ section, and $N_{jc}$ is a compressive axial force of the longitudinal compression member in the $j^{th}$ section.

12. The method for manufacturing state of a tensegrity structure of claim 11, wherein the calculation of the compression amounts of the longitudinal compression members is as follows:

$$\Delta l_j^n = l_{jc}^u - l_{jc}^c$$

where $\Delta l_j^n$ represents a compression amount of the longitudinal compression member in the $j^{th}$ section.

13. The method for manufacturing a tensegrity structure of claim 1, wherein the calculation of the forces of the annular compression members is as follows:

$$N_i = t_i \sin a_i - t_{i-1} \sin a_{i-1}$$

$$N_{ci} = N_i \times n / 2\pi$$

where $N_i$ represents the force of the $i^{th}$ annular compression member, $N_{ci}$ represents a axial pressure of the $i^{th}$ annular compression member, $t_i$ represents the tension of the $i^{th}$ longitudinal tie rod, $a_i$ represents a deflection angle between the longitudinal tie rod in the $i^{th}$ section and the longitudinal tie rod in the $(i-1)^{th}$ section, and n represents the number of the longitudinal tie rods along the circumference of the annular compression member.

14. The method for manufacturing a tensegrity structure of claim 13, wherein the calculation of the radial deformations of the annular compression members is as follows:

$$\Delta R_i = R_i^u - R_i^c$$

where $R_i^c$ is a current radius of the $i^{th}$ annular compression member under an equilibrium state, and $R_i^u$ is a radius of the $i^{th}$ annular compression member under a stress-free state.

15. The method for manufacturing a tensegrity structure of claim 12, wherein according to a symmetrical method, the forces of the various annular compression members at a first end of the tensegrity structure and the forces of the various annular compression members at a second end of the tensegrity structure are calculated.

16. The method for manufacturing a tensegrity structure of claim 1, wherein in the step of calculating the positioning lengths and the manufacturing lengths of the longitudinal compression members, minimum adjustment lengths of the longitudinal compression members satisfy the following formula:

$$\Delta L_{jc} \geq \Delta l_j^n + \Delta l_j^t$$

where $\Delta L_{jc}$ represents a minimum adjustment length of the longitudinal compression member in the $j^{th}$ section, $\Delta l_j^n$ represents a compression amount of the longitudinal compression member in the $j^{th}$ section, and $\Delta l_j^t$ is a stretching amount of the longitudinal tie rod in the $j^{th}$ section.

17. The method for manufacturing a tensegrity structure of claim 1, wherein the longitudinal tie rods are under tensile loads, with a material nonlinearity and damage being not considered; and the longitudinal compression members and the annular compression members are under compression loads, with a geometric nonlinearity and stability being considered.

18. The method for manufacturing a tensegrity structure of claim 1, wherein the longitudinal tie rods, the longitudinal compression members, and the annular compression members are composed of individual rod-shaped members.

19. The method for manufacturing a tensegrity structure of claim 1, wherein the longitudinal tie rods, the longitudinal compression members, and the annular compression members are truss structures.

20. The method for manufacturing a tensegrity structure of claim 1, wherein the longitudinal tie rods, the longitudinal compression members, and the annular compression members are made of carbon fiber composite materials.

* * * * *